United States Patent [19]

Persson et al.

[11] Patent Number: 5,449,050
[45] Date of Patent: Sep. 12, 1995

[54] LUBRICANT CONTAINER

[75] Inventors: Stig Persson; Uno Axelsson, both of Katrineholm; Peter Aqvist, Gothenburg, all of Sweden

[73] Assignee: SKF Mekan AB, Katrineholm, Sweden

[21] Appl. No.: 148,560

[22] Filed: Nov. 8, 1993

[30] Foreign Application Priority Data

Nov. 13, 1992 [SE] Sweden .................. 9203380

[51] Int. Cl.6 ............................................ F16N 11/04
[52] U.S. Cl. ................................. 184/45.1; 184/48.1
[58] Field of Search ................ 184/39, 41, 45.1, 45.2, 184/48.1, 48.2, 105.3; 251/149.6; 285/2-4, 94

[56] References Cited

U.S. PATENT DOCUMENTS

| 492,091 | 2/1893 | Lunken ........................ 184/48.2 |
| 4,886,144 | 12/1989 | Wengeler . | |

FOREIGN PATENT DOCUMENTS

| 0155329 | 9/1985 | European Pat. Off. . | |
| 0087627 | 1/1921 | Switzerland ................ 184/45.1 |

*Primary Examiner*—Edward K. Look
*Assistant Examiner*—Christopher Verdier
*Attorney, Agent, or Firm*—Burns, Doane, Swecker & Mathis

[57] ABSTRACT

A lubricant container (1) for lubricating apparatus intended to be interconnected with and to cooperate with a valve adapted to govern an advance feed motion of a discharge device (3,4) present in the container, and where the lubricant container (1) is equipped with a gable (7) with a substantially tubular neck portion (8) intended to take up a portion of the valve, which can be pushed thereinto, whereby a radially circumferential flange (9) is provided in the neck portion (8), the flange (9) being adapted to engage in interconnection position into an annular groove on the envelope surface of the valve, whereby the annular groove and the flange (9) are situated at such a distance from one end of the valve, and from the free end of the neck portion respectively, that seat portions (10,11) in the neck portion (8) and in the valve, sealingly engage against each other in the interconnection position, and that the annular groove and flange (9) are designed thus, that the flange (9), when the valve is pushed in its longitudinal direction into the neck portion (8), will snap into the annular groove, whereas a pulling apart force acting in the longitudinal direction of the valve and of the container (1), will result in a shearing off of the flange (9).

8 Claims, 2 Drawing Sheets

LUBRICANT CONTAINER

BACKGROUND OF THE INVENTION

Apparatuses for automatic lubrication of cooperating surfaces at different mechanical mechanisms are well-known and they operate to provide, according to certain predetermined parameters, a lubricant film, which prevents direct metallic contact between the cooperating surfaces of the mechanism and which furthermore has for a purpose to protect against wear and corrosion.

The volume of lubricant needed for the lubrication in each specific case thereby is often decided from experience, and the lubricant automaton is set to discharge a desired quantity of lubricant.

In many applications grease is advantageous as lubricant and the automatons intended for such lubrication often consist of a valve, through which the lubricant is discharged, and a container connectable to the valve, which container has an internal piston driven by a spring or possibly via a diaphragm by means of an electrolytically generated driving gas.

Admittedly the valve and the container commonly are manufactured as separate units, but they generally have been assembled in such a manner, that the entire lubricant container with valve has been discarded when the grease in the container has been consumed.

For grease lubrication of rolling bearings it is essential that the bearing components are not supplied with more lubricant than what is absolutely necessary for obtaining a satisfactory lubrication, and this means very small quantities, as it hereby is obtained the operational temperature that is most advantageous for the bearing assembly.

If too much lubricant is fed into the bearing assembly, the milling operation resulting therefrom, will cause a considerable increase of the bearing temperature, thus giving an impaired lubrication and risk for early ageing of the grease.

SE-C-8702597-9 describes an apparatus for automatic grease lubrication of bearings, wherein the valve is equipped with an element adapted to sense the heat development at the bearing position and to cause a reduction of the lubricant feed, when a predetermined temperature level is exceeded. The heat sensing and heat actuatable element then is constituted by a memory metal spring, which acts to reduce and/or completely close the discharge opening of the valve, when the temperature at the bearing position raises above a certain level, and this apparatus gives a satisfactory feed-out quantity, well adapted to the heat development.

With the design of the apparatus hitherto used, the valve will be thrown away together with the emptied grease container, which means that grease lubrication with hitherto used equipment implies a resource waste, particularly at temperature governed valves of the above mentioned kind, as the material of the memory metal spring is rather expensive. Certainly the valve part and the container of the apparatus according to the above mentioned patent can be taken apart, but a parting of the valve body and the container and subsequent mounting of a new container means a circumstantial and particularly in small spaces troublesome work which is hardly rational.

OBJECTS AND SUMMARY OF THE INVENTION

A purpose of the present invention is to eliminate the above mentioned drawbacks at a lubricant container for a lubricating apparatus, of the type where the container is intended to be interconnected with and cooperate with a valve adapted to govern the advance feed motion of a discharge device present in the container, and this is achieved in that the lubricant container is equipped with a gable having a substantially tubular neck portion intended to receive a portion of the valve, which can be pushed thereinto, whereby a radially circumferential flange is provided in the neck portion, which flange is adapted to engage in interconnection position into an annular groove on the envelope surface of the valve, whereby the annular groove and the flange are situated at such a distance from one end of the valve, and from the free end of the neck portion respectively, that seat portions present in the neck portion and in the valve sealingly engage against each other in said interconnection position, and that the annular groove and flange are designed thus, that the flange, when the valve is pushed in its longitudinal direction into the neck portion, will snap into the annular groove, whereas a pulling apart force acting in the longitudinal direction of the valve and of the container, will result in a shearing off of the flange.

BRIEF DESCRIPTION OF THE DRAWINGS

Hereinafter the invention will be described more in detail with reference to an embodiment shown in the accompanying drawings.

DESCRIPTION OF THE PREFERRED EMBODIMENT

Figure 1:
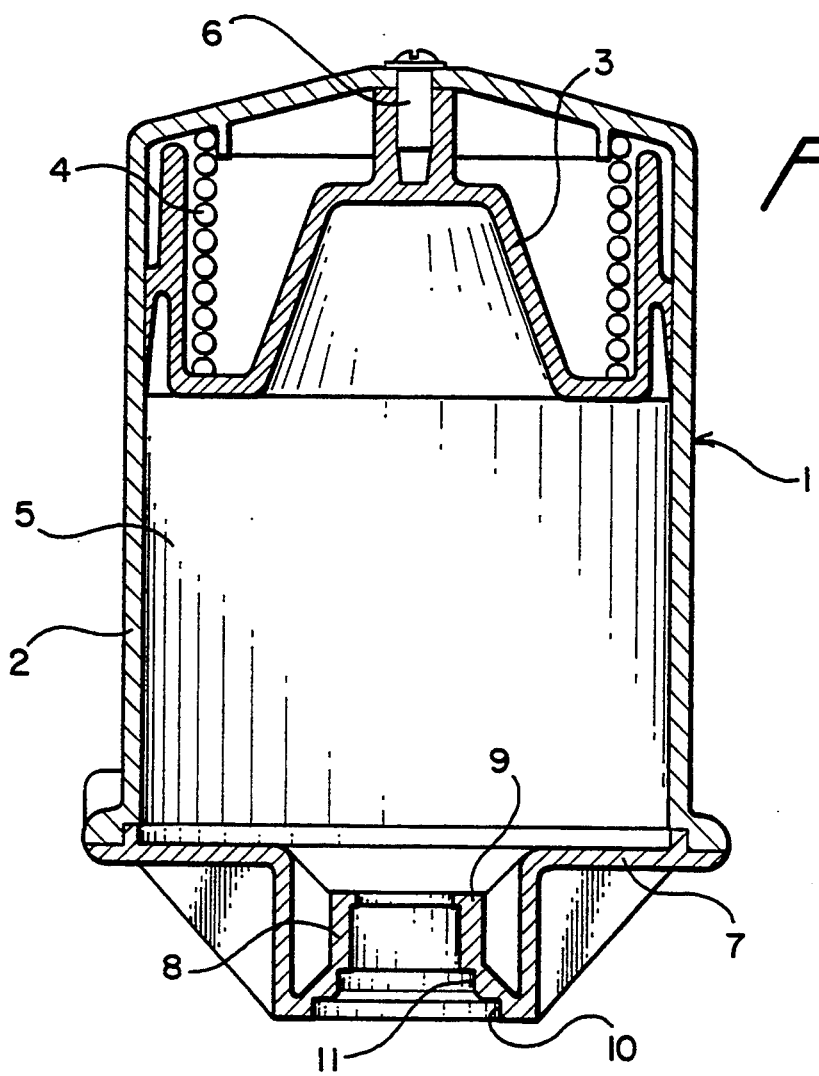
FIG. 1 shows a lubricant container according to the invention in a central vertical section.

FIG. 1 shows in an axial section a lubrication container 1 according to the invention, which incorporates a preferably cylindrical housing 2, having a closed top and in which is provided an axially displaceable piston 3. The piston is acted upon by a force acting between the piston and the upper part of the housing, said force here represented by a helical spring 4, which strives to press the piston downwards against lubricant present in the interior 5 of the container. At its upper part the piston 3 is prevented from displacement by means of a transport lock 6, in the form of a screw.

At the lower end of the housing 2, this is closed by a gable 7 with a centrally located tubular neck portion 8 projecting from the container and intended to be connected to a valve part, and which at its side facing the interior of the container being equipped with a radial circumferential flange 9. The circular channel through the neck-shaped portion, at its side turned away from the container is provided with a first and a second shoulder 10 and 11 respectively., extending from the outside and inwards, and acting as seats for the valve to be mounted therein. In transport position the channel through the neck-shaped portion is preferably closed by means of a not further shown protective cap, adapted to be inserted into the first shoulder 10, and which is manually removed before the container is connected to the valve.

Figure 2:
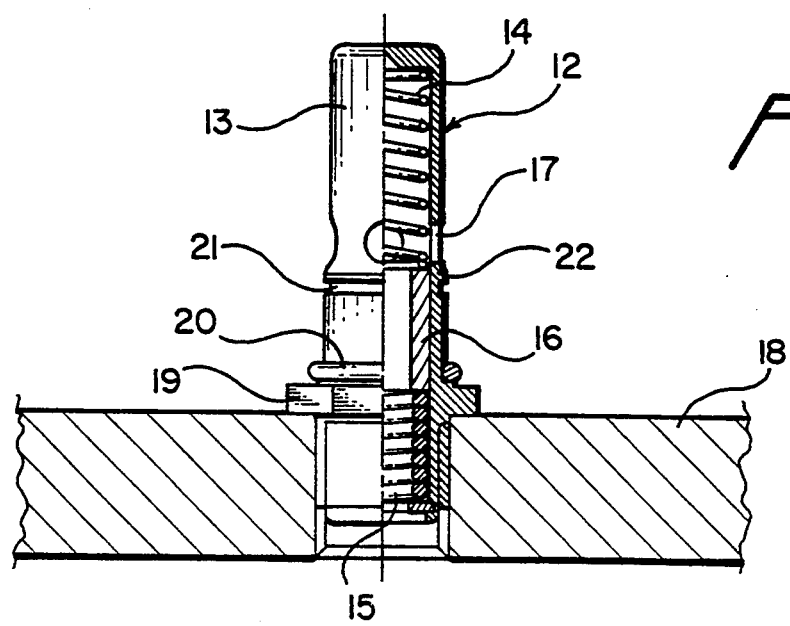
FIG. 2 shows in a partial cross section a valve part mounted in a seat and intended to be connected to a lubricant container according to FIG. 1, for forming a lubrication apparatus.

FIG. 2 shows, partially in a vertical section, an embodiment of a valve 12, intended to be connected to the lubricant container 1 according to FIG. 1, and which in the case shown is of the kind incorporating a sleeve shaped body 13 internally provided with a valve body 16, which is axially moveable and which is clamped between a first and a second spring 14, 15, said valve body being adapted to close radial discharge openings 17 provided in the sleeve-shaped body 13, when this is positioned in its upper (not shown) setting position. The second, lower spring 15 thereby is preferably made from a so called memory metal, whereas the first, upper spring 14 creates a counter-force against the memory metal spring, in order to balance the activity area of this. Such a valve is described in detail in the above mentioned SE-C-8702597-9 and it constitutes no actual part of the invention itself, which can be used also with a valve in form of a simple restriction, even if this gives no adjustability dependent of temperature changes at the position of lubrication. In the embodiment shown the valve is screwed in through a wall 18 on the opposite side of which the lubrication shall be effected and it rests with a circumferential flange 19 against the surface of the wall. The flange 19 at its side turned away from the wall is adapted to be received in the first shoulder 10 in the neck-shaped portion 8 of the lubricant container, and it is intended to be mounted with an O-ring 20 located about the periphery of the body 13 against the upper surface of the flange 10, and this O-ring is dimensioned sealingly to engage the second shoulder 11 in the container 1, when valve and container are joined together. Spaced apart from the upper side of the flange 19 in the valve a distance corresponding to the distance between the first shoulder 10 in the neck-shaped portion 8 of the container and the radially inwardly directed flange 9 thereof, there is provided at the periphery of the valve body an annular groove 21 with a circumferential chamfering 22 situated thereabove and extending downwards/outwards. The radially inwardly directed flange 9 in the neck-portion of the container is provided with a chamfering on its side turned away from the container, whereas its side facing the container is straight.

Figure 3:
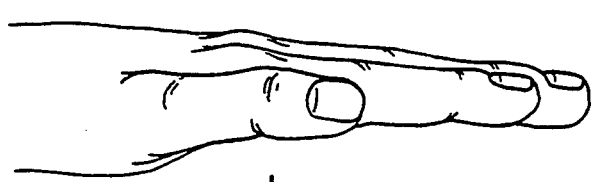
FIGS. 3–5 show in views corresponding to FIG. 1 assembly of the lubrication apparatus, activation thereof and removal of an emptied container, resp.
Figure 3:
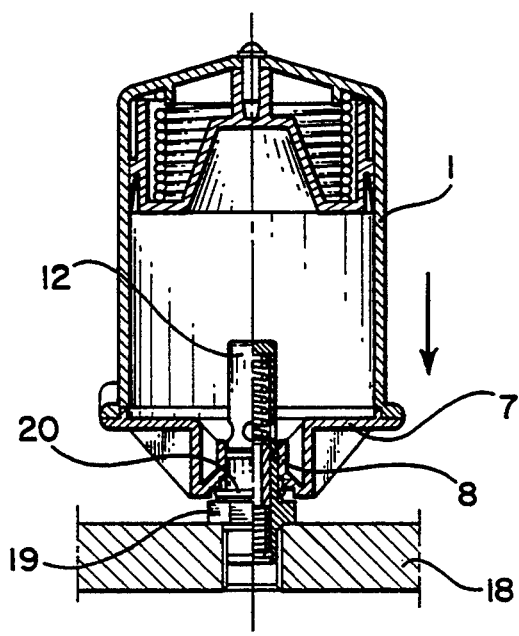

In FIG. 3 is shown schematically how container 1 and valve 12 can be put together in a very simple manner. The lubricant container 1 hereby is positioned with its neck-shaped portion 8 in the gable 7 thereof just above the valve body 13 which is screwed into a wall 18, whereupon the container manually is pushed down, thus that the valve flange and O-ring 20 will engage the seats 10 and 11 respectively in the container (see FIG. 1), whereby simultaneously the flange-shaped radial portion 9 by sliding against the valve shoulder 22 will snap into the groove 21 on the valve, which results in an interlocking of the valve and the container in a position where the very fine slit between the valve and the neck-shaped container portion is sealed off as the O-ring 20 is clamped therebetween. The snap-locking of the flange 9 into the annular groove is facilitated by the chamfering on the side of the flange turned away from the container.

Figure 4:
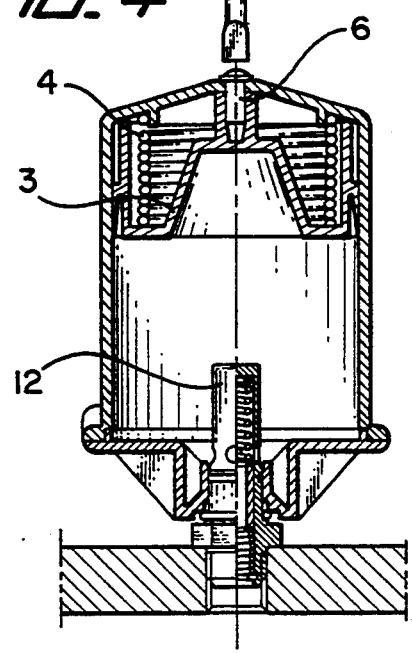

In FIG. 4 is shown how the lubricating apparatus constituted by the container and valve thus assembled is activated by the transport lock 6 being unscrewed thus that the driving spring 4 or the like can begin displacing the piston 3 and thereby bring about a slow discharge of the lubrican, whereby the discharge rate in the case shown, is governed by the thermal responsive valve.

Figure 5:
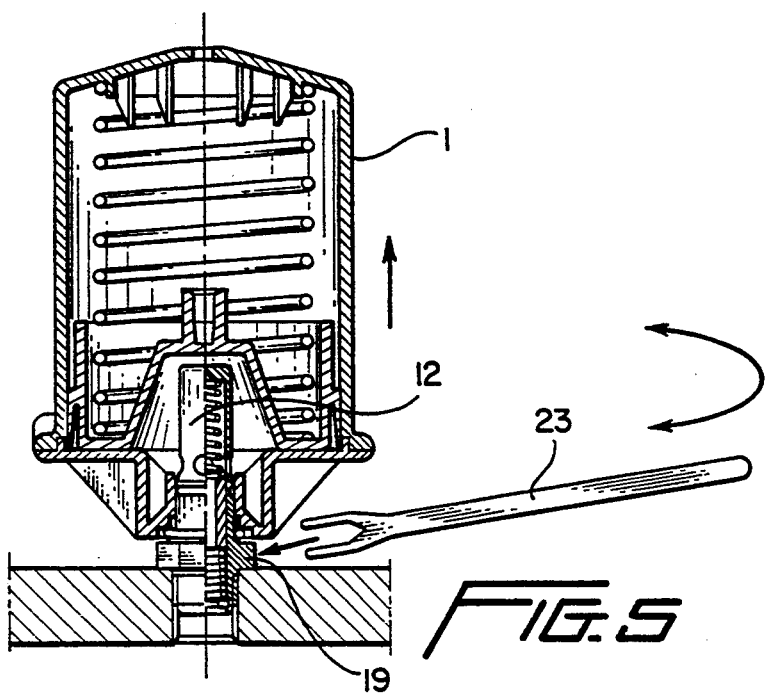

When the lubricant container 1 is emptied and the piston 3 thus is in its bottom position and the container shall be replaced a spanner 23 belonging to the lubricating apparatus is used, which spanner is introduced around the circumferential flange 19 of the valve, and which during breaking upwards (as shown with the arrow in FIG. 5) is urged to press against the end surface of the neck portion 8 of the container. Hereby the flange 9 projecting radially inwardly from the neck portion 8 of the container at its straight inner side facing the container will be subjected to a shearing force against the straight upper edge of the annular groove 21, which results in the flange being sheared off from the neck portion 8 and the emptied container 1 coming loose from the valve.

Figure 6:
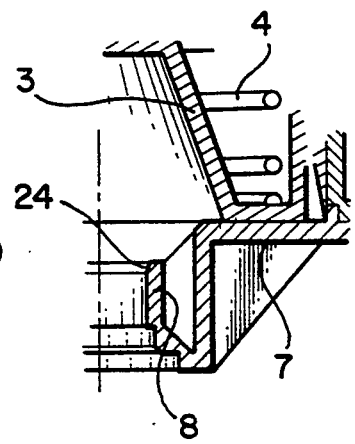
FIG. 6 shows a partial enlargement of a portion of the lower part of the container following its disassembly from the valve.

In FIG. 6 is shown in bigger scale and in cross section a part of the neck portion 8 of the emptied container, now removed from the valve and with its inner wall from which the flange 9 has been sheared off at 24.

When a new, filled container shall be mounted, the parts of the sheared off container flange still hanging around the valve are first removed, whereupon the new container is mounted in the manner as shown in FIGS. 3 and 4. Hereby the metallic and comparatively expensive valve part will be reuseable to an almost unlimited extent. The container part which is preferably made from plastic material, and considerably less expensive, can be discarded after being emptied. The lubricant container according to the invention has been shown in the accompanying drawings and described in connection thereto together with a valve with temperature dependent governing by means of memory metal spring, but the lubricant container may of course also be used with another type of valve and even with a valve only in the form of a simple restriction, even if the saving will be less in that case.

In the drawings and the associated description the application of the lubrication apparatus to the lubrication position furthermore has been shown with a valve screwed directly into a wall of the lubrication spot and with the container positioned in alignment with the valve screwed into the wall, but in positions difficult to reach, the valve may of course be located spaced apart from the wall of the lubrication spot and via a hose and a nipple be connected thereto, and it is also imaginable to have a valve with an angled attachment nipple, which provides a possibility of mounting the container even in parallel with the wall of the lubrication spot.

We claim:

1. A lubricant container, comprising:
    a substantially tubular neck portion, said neck portion having a free end;
    a circumferential flange in the neck portion;
    said tubular neck portion including means for receiving a valve portion having an envelope surface with an annular groove therein, whereby said flange engages with the annular groove when said valve portion is in an interconnection position in the neck portion;
    said neck portion further including neck seat portions that are located in such a position on said neck portion such that when said valve portion is in the interconnection position in the neck portion, said neck seat portions engage sealingly against valve seat portions on said valve portion; and said flange being arranged such that, when the valve portion is received in the neck portion, the flange snaps into the annular groove, and a pulling apart force acting in the longitudinal direction of the valve portion and of the container will result in a shearing off of the flange.

2. The lubricant container as claimed in claim 1, wherein the flange has, on its side turned away from an interior of the container, a chamfering, whereas its side facing the interior of the container is planar.

3. The lubricant container as claimed in claim 1, wherein the container includes a gable and the neck portion projects outward from the gable of the container.

4. The lubricant container as claimed in claim 2, wherein the container includes a gable and the neck portion projects outward from the gable of the container.

5. A lubricant container and valve system, comprising:

a container having a substantially tubular neck portion, said neck portion having a free end;

a circumferential flange in the neck portion;

a valve portion having an envelope surface with an annular groove therein;

said tubular neck portion including means for receiving the valve portion, whereby said flange engages with the annular groove when said valve is in an interconnection position in the neck portion;

valve seat portions on said valve portion;

said neck portion including neck seat portions located in such a position on said neck portion such that when said valve portion is in the interconnection position in the neck portion, said neck seat portions engage sealingly against said valve seat portions;

means for snapping said flange into said annular groove when the valve is received in the neck portion, and for shearing off the flange in the event of a pulling apart force acting in the longitudinal direction of the valve and of the container.

6. The lubricant container and valve system as claimed in claim 5, wherein the flange has, on its side turned away from an interior of the container, a chamfering, whereas its side facing the interior of the container is planar.

7. The lubricant container and valve system as claimed in claim 5, wherein the container includes a gable and the neck portion projects outward from the gable of the container.

8. The lubricant container and valve system as claimed in claim 6, wherein the container includes a gable and the neck portion projects outward from the gable of the container.

* * * * *